United States Patent
Yamamoto et al.

(10) Patent No.: US 6,838,570 B2
(45) Date of Patent: Jan. 4, 2005

(54) MOLDED CATALYST, PROCESS FOR PRODUCING MOLDED CATALYST, AND PROCESS FOR PRODUCING OXIRANE COMPOUND

(75) Inventors: Jun Yamamoto, Sodegaura (JP); Junpei Tsuji, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 188 days.

(21) Appl. No.: 10/181,984

(22) PCT Filed: Jan. 29, 2001

(86) PCT No.: PCT/JP01/00585

§ 371 (c)(1),
(2), (4) Date: Oct. 7, 2002

(87) PCT Pub. No.: WO01/56693

PCT Pub. Date: Aug. 9, 2001

(65) Prior Publication Data

US 2003/0083189 A1 May 1, 2003

(30) Foreign Application Priority Data

Feb. 2, 2000 (JP) ........................................ 2000-025052

(51) Int. Cl.$^7$ ............................................... B01J 29/06
(52) U.S. Cl. ..................... 549/529; 502/242; 502/350
(58) Field of Search ...................... 549/529; 502/242, 502/350

(56) References Cited

U.S. PATENT DOCUMENTS

| | | | |
|---|---|---|---|
| 4,367,342 A | | 1/1983 | Wulff et al. |
| 5,783,167 A | | 7/1998 | Corma Canos et al. |
| 6,054,112 A | | 4/2000 | Hasenzahl et al. |
| 6,096,910 A | * | 8/2000 | Yamamoto et al. ......... 549/529 |
| 6,211,388 B1 | * | 4/2001 | Tsuji et al. ................. 549/519 |
| 6,323,147 B1 | | 11/2001 | Yamamoto et al. |
| 6,512,128 B2 | * | 1/2003 | Yamamoto et al. ......... 549/529 |

FOREIGN PATENT DOCUMENTS

| | | |
|---|---|---|
| CN | 1247101 A | 3/2000 |
| CN | 1248579 A | 3/2000 |
| EP | 0 655 278 A1 | 5/1995 |
| EP | 0 838 431 A1 | 4/1998 |
| JP | 07-300312 A | 11/1995 |

OTHER PUBLICATIONS

Peter T. Tanev et al., "Titanium–containing mesoporous molecular sieves for catalytic oxidation of aromatic compounds", Nature, vol. 368, Mar. 24, 1994, pp. 321–323.

* cited by examiner

Primary Examiner—Kiley Stoner
Assistant Examiner—Christina Ildebrando
(74) Attorney, Agent, or Firm—Sughrue Mion, PLLC

(57) ABSTRACT

A titanium-containing silicon oxide molded catalyst satisfying all of the following conditions (1) to (4):

(1) an average pore diameter is 10 Å or more,
(2) 90% or more of the whole pore volume have pore diameters of 5 to 200 Å,
(3) a specific pore volume is 0.2 cm$^3$/g or more, and
(4) it is obtained by using as a template a quaternary ammonium ion of the following general formula (I) or an amine of the following general formula (II), then, removing the template.

$$[NR^1R^2R^3R^4]^+ \qquad (I)$$

(in the formula (I), $R^1$ represents a linear or branched hydrocarbon group having 2 to 36 carbon atoms, and $R^2$ to $R^4$ represent an alkyl group having 1 to 6 carbon atoms.)

$$NR^5R^6R^7 \qquad (II)$$

(in the formula (II), $R^5$ represents a linear or branched hydrocarbon group having 2 to 36 carbon atoms, and $R^6$ and $R^7$ represent hydrogen or an alkyl group having 1 to 6 carbon atoms.).

6 Claims, No Drawings

MOLDED CATALYST, PROCESS FOR PRODUCING MOLDED CATALYST, AND PROCESS FOR PRODUCING OXIRANE COMPOUND

TECHNICAL FIELD

The present invention relates to a molded catalyst, a process for producing the molded catalyst and a process for producing an oxirane compound. More specifically, the present invention relates to a molded catalyst which can produce an oxirane compound from an olefin type compound and a hydroperoxide under high yield and high selectivity, a process for producing the molded catalyst, and a process for producing an oxirane compound.

BACKGROUND ART

Titanium-containing silicon oxides synthesized using a quaternary ammonium ion or amine as a template are publicly known. As those having pores having an average pore diameter of 10 Å or more, Ti-MCM41 disclosed in U.S. Pat. No. 5,783,167, Ti-MCM48 disclosed in JP07-300312A, Ti-HMS disclosed in Nature 368 (1994) p. 321, and the like are known. Since any of these titanium-containing silicon oxides has a large pore diameter of 20 Å or more, these show a high activity even in an epoxidation using, as a reaction substance, a large size molecule such as an aromatic compound manifesting a low activity by conventional zeolite having a small pore diameter. Further, due to large surface area, it is known that these titanium-containing silicon oxides show higher activity in the above-mentioned reaction than with a titanium-supported type silica catalyst as shown in U.S. Pat. No. 4,367,342.

However, any of these titanium-containing silicon oxide catalysts is obtained in the form of a fine particle, and it is supposed these are not suitable for a fixed bed reaction which is a characteristic use embodiment of a solid catalyst.

A subject to be solved by the present invention under such conditions is to provide a titanium-containing silicon oxide molded catalyst which can produce an oxirane compound from an olefin type compound and a hydroperoxide under high yield and high selectivity, a process for producing the above-mentioned molded catalyst, and a process for producing an olefin type compound.

DISCLOSURE OF THE INVENTION

Namely, the present invention relates to a titanium-containing silicon oxide molded catalyst satisfying all of the following conditions (1) to (4):

(1) an average pore diameter is 10 Å or more, (2) 90% or more of the whole pore volume have a pore diameter of 5 to 200 Å, (3) a specific pore volume is 0.2 cm³/g or more, and (4) it is obtained by using, as a template, a quaternary ammonium ion of the following general formula (I) or an amine of the following general formula (II), then, removing the template.

(in the formula (I), $R^1$ represents a linear or branched hydrocarbon group having 2 to 36 carbon atoms, and $R^2$ to $R^4$ represent an alkyl group having 1 to 6 carbon atoms.)

(in the formula (II), $R^5$ represents a linear or branched hydrocarbon group having 2 to 36 carbon atoms, and $R^6$ and $R^7$ represent hydrogen or an alkyl group having 1 to 6 carbon atoms.).

Further, the present invention relates to a process for producing the above-mentioned molded catalyst comprising the following steps:

first step: a step for obtaining a solid containing a catalyst component and a template by mixing and stirring a silica source, a titanium source, and a quaternary ammonium ion or amine as a template in liquid condition, second step: a step for molding the solid containing the catalyst component, and third step: a step for removing the template from the solid containing the catalyst component and the template.

Furthermore, the present invention relates to a process for producing an oxirane compound comprising reacting an olefin type compound with a hydroperoxide in the presence of the above-mentioned molded catalyst.

BEST MODE FOR CARRYING OUT THE INVENTION

The titanium-containing silicon oxide molded catalyst of the present invention satisfies the following conditions (1) to (4).

The condition (1) is that the average pore diameter is 10 Å or more.

The condition (2) is that 90% or more of the whole pore volume have pore diameters of 5 to 200 Å.

The condition (3) is that the specific pore volume is 0.2 cm³/g or more.

Here, the above-mentioned specific pore volume means a pore volume per g of a catalyst.

The structures of the above-mentioned conditions (1) to (3) can be confirmed by using a method of physically adsorbing a gas such as nitrogen, argon or the like and by measurement according to an ordinary method.

The condition (4) is that the catalyst is obtained by using, as a template, a quaternary ammonium ion of the following general formula (I) or an amine of the following general formula (II), then, removing the template.

(in the formula (I), $R^1$ represents a linear or branched hydrocarbon group having 2 to 36 carbon atoms, and $R^2$ to $R^4$ represent an alkyl group having 1 to 6 carbon atoms.)

(in the formula (II), $R^5$ represents a linear or branched hydrocarbon group having 2 to 36 carbon atoms, and $R^6$ and $R^7$ represent hydrogen or an alkyl group having 1 to 6 carbon atoms.).

The condition (4) is described in detail in the explanation of the following catalyst production method.

The titanium-containing silicon oxide (hereinafter, referred to as catalyst in some cases) in the molded catalyst of the present invention preferably has an absorption peak in the region of 960±5 cm⁻¹ in the infrared absorption spectrum. This peak is believed to correspond to titanium introduced into a silica skeleton. In a X-ray diffraction of the catalyst of the invention, a peak showing spacing d may present or not present. The peak showing spacing d herein referred to indicates a peak derived from crystallinity and regularity of solid, and a broad peak derived from an amorphous part may present.

The molded catalyst of the present invention is suitably produced by a production method having the following steps:

first step: a step for obtaining a solid containing a catalyst component and a template by mixing and stirring a silica source, a titanium source, and a quaternary ammonium ion or amine as a template in liquid condition, second step: a step for molding the solid containing the catalyst component, and third step: a step for removing the template from the solid containing the catalyst component and the template.

Here, the first step is a step for obtaining the solid containing the catalyst component and the template by mixing and stirring the silica source, the titanium source, and the quaternary ammonium ion or amine as a template in liquid condition. When a reagent used is solid-like, it is preferably used in the form of solution dissolved in a solvent.

The silica source includes amorphous silica and alkoxysilanes, for example, tetramethyl orthosilicate, tetraethyl orthosilicate, tetrapropyl orthosilicate and the like.

The titanium source includes titanium alkoxides, for example, tetramethyl titanate, tetraethyl titanate, tetrapropyl titanate, tetraisopropyl titanate, tetrabutyl titanate, tetraisobutyl titanate, tetra-2-ethylhexyl titanate, tetraoctadecyl titanate, and titanium (IV) oxyacetylacetonate, titanium (IV) diisopropoxybisacetylacetonate and the like, and titanium halides, for example, titanium tetrachloride, titanium tetrabromide, titanium tetraiodide and the like.

As the template, a quaternary ammonium ion of the following general formula (I) or an amine of the following general formula (II) is used.

$$[NR^1R^2R^3R^4]^+ \quad (I)$$

(in the formula (I), $R^1$ represents a linear or branched hydrocarbon group having 2 to 36 carbon atoms, and $R^2$ to $R^4$ represent an alkyl group having 1 to 6 carbon atoms.)

$$NR^5R^6R^7 \quad (II)$$

(in the formula (II), $R^5$ represents a linear or branched hydrocarbon group having 2 to 36 carbon atoms, and $R^6$ and $R^7$ represent hydrogen or an alkyl group having 1 to 6 carbon atoms.).

In the formula (I), $R^1$ represents a linear or branched hydrocarbon group having 2 to 36 carbon atoms, preferably having 10 to 18 carbon atoms. $R^2$ to $R^4$ represent an alkyl group having 1 to 6 carbon atoms, and it is preferable that all of $R^2$ to $R^4$ are a methyl group.

Specific examples of the quaternary ammonium ion of the general formula (I) include cations such as hexadecyltrimethylammonium, dodecyltrimethylammonium, benzyltrimethylammonium, dimethyldidodecylammonium, hexadecylpyridinium and the like.

In the formula (II), $R^5$ represents a linear or branched hydrocarbon group having 2 to 36 carbon atoms, preferably having 10 to 18 carbon atoms. $R^6$ and $R^7$ represent hydrogen or an alkyl group having 1 to 6 carbon atoms, and preferably, $R^6$ and $R^7$ are hydrogen.

Specific examples of the amine of the general formula (II) include octylamine, nonylamine, decylamine, undecylamine, dodecylamine, tridecylamine, tetradecylamine, pentadecylamine, hexadecylamine, heptadecylamine, octadecylamine, nonadecylamine, eicosylamine, and those in which these amines are substituted with a methyl group, such as methylaklkylamines, dimethylaklkylamines and the like.

These quaternary ammonium ions of the general formula (I) and amines of the general formula (II) can be used alone or in admixture of a few kinds thereof.

As the examples of the solvent, water and alcohols, for example, methanol, ethanol, n-propanol, 2-propanol, n-butanol, sec-butanol, t-butanol, vinyl alcohol, allyl alcohol, cyclohexanol, benzyl alcohol and the like and diols, and mixtures thereof and the like are listed.

The use amount of the titanium source to the silica source is $10^{-5}$ to 1, preferably 0.00008 to 0.4 by molar ratio. The use amount of the quaternary ammonium ion or amine to the total amount of the silica source and titanium source is preferably $10^{-2}$ to 2 by molar ratio.

For promoting a reaction between the silica source and the titanium source, alkalinity or acidity is preferably imparted to a mixed solution. As the alkali source, quaternary ammonium hydroxides are preferable, and the examples thereof include ammonium hydroxide, tetramethylammonium hydroxide, tetraethylammonium hydroxide, tetrapropylammonium hydroxide and the like, and it is more preferable to use hydroxides of quaternary ammonium ions represented by the general formula (I). On the other hand, as the examples of the acid, inorganic acids such as hydrochloric acid, sulfuric acid, nitric acid and the like, and organic acids such as formic acid, acetic acid, propionic acid and the like are listed.

The temperature for mixing and stirring is usually from −30 to 100° C. A solid is formed by mixing and stirring, and this may also be aged for further growth of the solid. The aging time is usually 180 hours or less, and the aging temperature is usually from 0 to 200° C. When heating is necessary in aging, it is preferable to place the material into a pressure resistant vessel and to conduct aging under closed condition for avoiding vaporization of a solvent.

The second step is a step for molding the solid containing a catalyst component. This molding step may be conducted at any stage before and after the template removal step and after a silylation step described later, and it is preferable, from the standpoint of suppression of deterioration in catalyst physical properties such as specific surface area and pore volume and the like, to conduct the molding step before the third step, template removal step.

As the molding method, any method such as compression molding, extrusion molding or the like may be used. In the extrusion molding, it is possible to use organic and inorganic binders generally used, however, decrease in catalyst activity may be caused in some cases by addition of a binder.

In production of the molded catalyst, a compression molding method is most preferable from the standpoint of catalyst strength and catalyst physical properties.

The pressure for compression is usually from 0.1 to 10 ton/cm$^2$, preferably from 0.2 to 5 ton/cm$^2$, further preferably from 0.5 to 2 ton/cm$^2$. When pressure is too low, the strength of the molded body may be insufficient, on the other hand, when pressure is too high, pores maybe broken and catalyst physical properties may be insufficient.

In conducting compression molding, it is preferable that the solid containing a catalyst component contains a suitable amount of water, and by this, a molded body having a sufficient strength can be made even at lower compression pressure. The water content of the solid containing a catalyst component subjected to compression molding is preferably from 1 to 70% by weight (solid+water=100% by weight), further preferably from 5 to 40% by weight. The water content may be controlled to the degree of drying in drying wet solid, or water may be added to sufficiently dried solid.

A generally used binder or the like may be added in a range causing not problem in desired ability.

The form of the molded body may be any form such as tablet, sphere, ring or the like. It may be used in its form for a reaction or the like, or ground into suitable size before use.

The size of the molded body can be appropriately determined in view of the form of the molded body, the size and type of a reaction vessel, and the like and is not particularly restricted, however, the opening of a sieve is preferably from 0.1 to 10 mm (namely, passes through a sieve having an opening of 10 mm and not pass through a sieve having an opening of 0.1 mm), more preferably from 0.3 to 3 mm. When ground materials have wide distribution in size, the size distribution may be narrowed by fractionation by a sieve or the like.

The third step is a step for removing a template from a solid containing a catalyst component and a template. Removal of the template can be attained easily by calcining the solid containing the catalyst component and the template at high temperatures of from 400 to 700° C. under air atmosphere, or by subjecting the solid containing the catalyst component and the template to solvent extraction operation with a solvent, and among them, removal of a template by solvent extraction is more preferable.

A technique of extracting a template with a solvent is reported by Whitehurst et al.(see U.S. Pat. No. 5,143,879). The solvent used for extraction may be one capable of dissolving a compound used for a template, and in general, oxygen-containing hydrocarbons liquid at normal temperature having 1 to about 12 carbon atoms can be used. As the suitable solvent, alcohols, ketones, ethers (non-cyclic and cyclic) and esters can be used, and examples thereof include hydroxy-substituted hydrocarbons such as methanol, ethanol, ethylene glycol, propylene glycol, isopropanol, n-butanol and octanol; oxo-substituted hydrocarbons such as acetone, diethylketone, methyl ethyl ketone and methyl isobutyl ketone; hydrocarbon ethers such as diisobutyl ether and tetrahydrofuran; hydrocarbon esters such as methyl acetate, ethyl acetate, butyl acetate and butyl propionate; and the like. Further, water can be used as a solvent, and a mixed solution of the fore-mentioned solvents can also be used.

The weight ratio of these solvent to a catalyst is usually from 1 to 1000, preferably from 5 to 300.

For improving an extraction effect, acids or salts thereof may be added to these solvents. As the examples of the acid used, inorganic acids such as hydrochloric acid, sulfuric acid, nitric acid, hydrobromic acid and the like and organic acids such as formic acid, acetic acid, propionic acid and the like are listed. As the examples of these salts, alkali metal salts, alkaline earth metal salts, ammonium salts and the like are listed. The concentration of the acid or salt thereof to be added in a solvent is preferably 10 mol/l or less, further preferably 5 mol/l or less. When the concentration of the acid or salt thereof in a solvent is too high, titanium present in a catalyst is eluted, leading to decrease in catalytic activity in some cases.

After sufficient mixing of a solvent and a catalyst, a liquid phase part is separated by a method such as filtration or decantation or the like. This operation is repeated for necessary times. It is also possible to effect extraction by a method of passing a washing solvent through a the solid containing the catalyst component and the template. Completion of washing can be checked by, for example, analysis of a liquid phase part. The extraction temperature is preferably from 0 to 200° C., further preferably from 20 to 100° C. When the boiling point of the extraction solvent is low, extraction may be effected under pressure.

It is possible to conduct extraction using supercritical fluid instead of use of the above-mentioned organic extraction solvent. As the supercritical fluid, carbon dioxide is preferable. The critical temperature of carbon dioxide is about 31° C. or higher, and the extraction temperature is preferably from 31 to 100° C., further preferably from 35 to 60° C. The critical pressure is about 74 kg/cm$^2$, and preferably from 100 to 300 kg/cm$^2$. It is preferable that supercritical fluid carbon dioxide of 50 to 500 g per minute per liter of a catalyst is used for extraction, and the extraction time is from 4 to 20 hours.

A solid obtained after the extraction treatment may be subjected to drying treatment. Namely, solid is heated at temperatures preferably from 10 to 800° C., further preferably from 50 to 300° C. under an atmosphere of non-reducing gases, for example, nitrogen, argon or carbon dioxide, or an oxygen-containing gas, for example, air.

In production of the catalyst, it is preferable to use the following fourth step.

Fourth step: a step for subjecting the solid obtained by removing a template to silylation treatment.

In the silylation treatment, the solid obtained by removing the template is brought into contact with a silylation agent thereby converting a hydroxyl group present on the surface of the catalyst into a silyl group. As the silylation agent, organic silanes, organic silylamines, organic silylamides and derivatives thereof, and organic silazanes and other silylation agents are listed.

Examples of the organic silane include chlorotrimethylsilane, dichlorodimethylsilane, chlorobromodimethylsilane, nitrotrimethylsilane, chlorotriethylsilane, iododimethylbutylsilane, chlorodimethylphenylsilane, dichlorodimethylsilane, dimethyl n-propylchlorosilane, dimethylisopropylchlorosilane, t-butyldimethylchlorosilane, tripropylchlorosilane, dimethyloctylchlorosilane, tributylchlorosilane, trihexylchlorosilane, dimethylethylchlorosilane, dimethyloctadecylchlorosilane, n-butyldimethylchlorosilane, bromomethyldimethylchlorosilane, chloromethyldimethylchlorosilane, 3-chloropropyldimethylchlorosilane, dimethoxymethylchlorosilane, methylphenylchlorosilane, triethoxychlorosilane, dimethylphenylchlorosilane, methylphenylvinylchlorosilane, benzyldimethylchlorosilane, diphenyldichlorosilane, diphenylmethylchlorosilane, diphenylvinylchlorosilane, tribenzylchlorosilane and 3-cyanopropyldimethylchlorosilane.

Examples of the organic silylamine include N-trimethylsilylimidazole, N-t-butyldimethylsilylimidazole, N-dimethylethylsilylimidazole, N-dimethyl n-propylsilylimidazole, N-dimethylisopropylsilylimidazole, N-trimethylsilyldimethylamine, N-trimethylsilyldiethylamine, N-trimethylsilypyrrole, N-trimethylsilylpyrrolidine, N-trimethylsilylpyperidine, 1-cyanoethyl(diethylamino)dimethylsilane and pentafluorophenyldimethylsilylamine.

Examples of the organic silylamide and derivatives include N,0-bistrimethylsilylacetamide, N,0-bistrimethylsilyltrifluoroacetamide, N-trimethylsilylacetamide, N-methyl-N-trimethylsilylacetamide, N-methyl-N-trimethylsilyltrifluoroacetamide, N-methyl-N-trimethylsilylheptafluorobutylamide, N-(t-butyldimethylsilyl)-N-trifluoroacetamide and N,0-bis (diethylhydrosiyl)trifluoroacetamide.

Examples of the organic silazane include hexamethyldisilazane, heptamethyldisilazane, 1,1,3,3- tetramethyldisilazane, 1,3-bis(chloromethyl) tetramethyldisilazane, 1,3-divinyl-1,1,3,3-tetramethyldisilazane and 1,3-diphenyltetramethyldisilazane.

As other silylation agents, N-methoxy-N,0-bistrimethylsilyltrifluoroacetamide, N-methoxy-N,0-bistrimethylsilyl carbamate, N,0-bistrimethylsilyl sulfamate, trimethylsilyltrifluoromethane sulfonate, N,N'-bistrimethylsilylurea.

The preferable silylation agent is hexamethyldisilazane.

Thus prepared catalyst has high surface area and highly dispersed titanium active sites, therefore, it is supposed this catalyst can be used for selective oxidation reactions, for example, an epoxidation reaction of an olefin, an ammoximation reaction of ketone, ketone synthesis reaction, glycolation reaction, hydroxylation reaction of benzene and the like. It is also possible to generate acid sites by addition of a third component such as alumina or the like, and it is supposed that the catalyst can be used also for an alkylation reaction, catalytic reforming reaction and the like.

The catalyst of the present invention can be suitably used for a process for producing an oxirane compound by reacting an olefin type compound with a hydroperoxide.

The olefin type compound may be non-cyclic, monocyclic, bicyclic or polycyclic compound, and may be of monoolefin type, diolefin type or polyolefin type. When two or more olefin bonds are present, these may be a conjugated bond or non-conjugated bond. Olefin type compounds having 2 to 60 carbon atoms are generally preferable. Though a substituent may be present, it is preferable that the substituent is a relatively stable group. Examples of such a hydrocarbon include ethylene, propylene, butene-1, isobutylene, hexene-1, hexene-2, hexene-3, octene-1, decene-1, styrene, cyclohexene and the like. As the examples of the suitable diolefin type compound, butadiene and isoprene are listed. A substituent may be present, and exemplified are halogen atoms, furthermore, various substituents having oxygen, sulfur or nitrogen atom together hydrogen and/or carbon atom may be present. The particularly preferable olefin type compound is an olefin type unsaturated alcohol and an olefin type unsaturated hydrocarbon substituted with a halogen, and exemplified are allyl alcohol, crotyl alcohol, allyl chloride. Particularly suitable are alkenes having 3 to 40 carbon atoms, and these may be substituted with a hydroxyl group or halogen atom.

As the examples of the hydroperoxide, organic hydroperoxides are listed. The organic hydroperoxide is a compound of the general formula:

R—O—O—H (wherein, R represents a mono-valent hydrocarbyl group.) and, this is reacted with an olefin type compound to form an oxirane compound and a compound R—OH. Preferably, the group R is a group having 3 to 20 carbon atoms. Most preferably, the group R is a hydrocarbyl group having 3 to 10 carbon atoms, particularly, a secondary or tertiary alkyl group or aralkyl group. Of them, particularly preferable groups are tertiary alkyl groups, and secondary or tertiary aralkyl groups, and specific examples thereof include a tertiary butyl group, tertiary pentyl group, cyclopentyl group and 2-phenylpropyl-2 group, further, various tetranylyl groups formed by removing a hydrogen atom from an aliphatic side chain of a tetralin molecule, are also listed.

When cumene hydroperoxide is used as the organic hydroperoxide, the resulting hydroxyl compound is 2-phenyl-2-propanol. This can be converted into α-methylstyrene by dehydration reaction. α-methylstyrene is an industrially useful substance.

Tertiary amylene formed by a dehydration reaction of tertiary pentyl alcohol obtained when tertiary pentyl hydroperoxide is used as the organic hydroperoxide, is a substance useful as the precursor of isoprene. The tertiary pentyl alcohol is useful also as the precursor of methyl tertiary pentyl ether which is an octane value improving agent.

Tertiary-butyl alcohol obtained when t-butyl hydroperoxide is used as the organic hydroperoxide is a substance useful as the precursor of methyl t-butyl ether which is an octane value improving agent.

As the hydroperoxide other than the organic hydroperoxide, hydrogen peroxide is exemplified.

Hydrogen peroxide is a compound of the chemical formula: HOOH, and can be obtained usually in the form of an aqueous solution. This reacts with an olefin type compound to form an oxirane compound and water.

The organic hydroperoxide and hydrogen peroxide used as the raw material substance may be a dilute or dense purified or non-purified substance.

The epoxidation reaction can be carried out in a liquid phase using a solvent and/or a diluting agent. The solvent and diluting agent must be liquid under temperature and pressure in reaction and inactive substantially to the reactant and the product. The solvent may be composed of a substance present in a hydroperoxide solution used. For example, when cumene hydroperoxide is a mixture of cumene hydroperoxide and cumene which is a raw material thereof, it is also possible that a solvent is not particularly added and the mixture is used instead of a solvent.

The epoxidation reaction is generally from 0 to 200° C., and temperatures of from 25 to 200° C. are preferable. The pressure may be a pressure enough to maintain the reaction mixture in a liquid condition. Generally, it is advantageous that the pressure is from 100 to 10000 kPa.

After completion of the epoxidation reaction, a liquid mixture containing the desired product can be easily separated from a catalyst composition. Subsequently, the liquid mixture can be purified by a suitable method. The purification includes fractional distillation, selective extraction, filtration, washing and the like. The solvent, catalyst, unreacted olefin type compound and unreacted hydroperoxide can also be recycled and reused.

The method of the present invention can be conducted in the form of slurry and fixed bed, and in the case of a large scale industrial operation, a fixed bed is preferably used. When the molded catalyst of the present invention is used in a fixed bed, pressure loss before and after a reaction tube is small as compared with the case of use of a powder, therefore, operation of the reaction is easy, and bleeding to the downstream of a catalyst is also small, consequently, separation of the catalyst from the product is easy, handling in filling and the like is also excellent, meaning industrially excellent characteristics. The process of the present invention can be carried out by a batch-wise process, semi-continuous process or continuous process. When liquid containing a reactant is passed through a fixed bed, the liquid mixture discharged from the reaction region contains no catalyst at all or substantially no catalyst.

EXAMPLES

The following examples illustrate the present invention.

Example 1
Preparation of Catalyst (First Step)

625.5 g of a 16 wt % hexadecyltrimethylammonium hydroxide aqueous solution was stirred, to this was added dropwise a mixed solution of 9.25 g of tetraisopropyl titanate and 50.0 g of 2-propanol at room temperature. After stirring for 30 minutes, 190.5 g of tetramethyl orthosilicate was dropped. After addition of 5.0 g of 2-propanol, the mixture was stirred for 3 hours. The produced precipitation was filtrated off, and washed with 5 liter of ion exchanged water. The resulted precipitation was dried at 100° C. for 5 hours under reduced pressure.

Production of Molded Body (Second Step)

8.0 g of water was added to 40.0 g of a while solid obtained in the first step of Example 1 and mixed well, and the resulted mixture was compression molded under a pressure of 1 ton/cm² using a tablet molding apparatus (internal diameter: 3 cm). The resulted tablet was ground, and catalyst molded bodies of 0.5 to 1.0 mm were obtained using a sieve. Solids of 0.5 mm or less were recycled, and compression-molded again. The resulted catalyst molded bodies of 0.5 to 1.0 mm were dried at 100° C. for 5 hours.

Extraction Removal of Template (Third Step)

20 g of the molded bodies obtained in the second step were charged into a flask, and to this was added a mixed solution of 200 ml of methanol and 10 g of concentrated hydrochloric acid (content: 36 wt %). The mixture was heated for 1 hour at the reflux temperature while stirring, and allowed to cool, then, the solution was removed by filtration. Using a mixed solution of 200 ml of methanol and 5 g of concentrated hydrochloric acid, the same operation was repeated once more. Finally, refluxing was conducted for 1 hour with 200 ml of methanol, then, the finally filtrated molded bodies were dried at 120° C. under 10 mmHg for 1.5 hours.

Silylation (Fourth Step)

10 g of the molded bodies obtained in the third step, 6.8 g of hexamethyldisilazane and 100 g of toluene were mixed, and the mixture was refluxed under heat for 1.5 hours while stirring. Liquid was removed by filtration from the mixture. The product was washed with 200 g of toluene, and dried under a reduced pressure of 10 mmHg at 120° C. for 2 hours, to obtain a molded catalyst.

The molded catalyst prepared as described above had a specific surface area of 1144 m²/g, an average pore diameter of 26.0 Å and a pore volume of 0.74 ml/g.

Comparative Example 1

The white solid obtained in the first step of Example 1 was subjected directly to the extraction removal of a template (third step) and the silylation (fourth step) without effecting the compression molding (second step) in Example 1, to obtain a catalyst powder. The conditions for each of the treatments were the same as in Example 1.

The catalyst powder prepared as described above had a specific surface area of 952 m²/g, an average pore diameter of 24.5 Å and a pore volume of 0.59 ml/g.

Example 2

Synthesis of Propylene Oxide (PO)

The molded catalyst obtained in Example 1 was evaluated by a fixed bed flow reaction apparatus using 27% cumene hydroperoxide (CHPO) and propylene (C3'). The catalyst bed had an internal diameter of 4 mm and a length of 600 mm, and the reaction conditions included a LHSV of 8 h⁻¹, a C3'/CHPO molar ratio of 10, a reaction pressure (catalyst bed outlet) of 3 MPa and a reaction temperature of 50° C. From 5 hours after initiation of the reaction, sampling was conducted for 30 minutes. The reaction results are shown in Table 1.

Comparative Example 2

The catalyst powder obtained in Comparative Example 1 was evaluated by a fixed bed flow reaction apparatus in the same manner as in Example 2. The reaction results are shown in Table 1.

TABLE 1

|  | Example 2 | Comparative example 2 |
|---|---|---|
| Catalyst properties |  |  |
| Average pore diameter (Å) | 26.0 | 24.5 |
| Pore distribution range (Å) | 5–80*¹ | 5–80 |
| Specific pore volume (cm³/g) | 0.74 | 0.59 |
| Form | Molded body | Powder |
| Reaction results |  |  |
| Catalyst amount (g) | 2.87 | 2.52 |
| CHPO conversion (%) | 98.3 | 98.3 |
| PO/C3' selectivity (%)*² | 99.4 | 99.6 |
| Pressure loss (MPa)*³ | <0.1 | 0.5 |

*¹Minimum value of pore distribution is measuring limitation value by nitrogen adsorption method
*²PO/C3' selectivity = (produced PO mol/reacted C3' mol) × 100
*³pressure loss is difference in pressure before and after catalyst bed In the epoxidation reaction of propylene using cumene hydroperoxide in Table 1, the molded catalyst of the present invention shows high activity and selectivity abilities corresponding to those of a powder, and pressure loss before and after a catalyst bed is scarcely observed. Since pressure loss is in proportion to the length of a catalyst bed, the molded catalyst of the present invention is excellent for industrial implementation.

INDUSTRIAL APPLICABILITY

According to the present invention, a titanium-containing silicon oxide molded catalyst which can produce an oxirane compound from an olefin type compound and a hydroperoxide under high yield and high selectivity, a process for producing the above-mentioned molded catalyst, and a process for producing an oxirane compound can be provided.

What is claimed is:

1. A titanium-containing silicon oxide molded catalyst satisfying all of the following conditions (1) to (4):

(1) an average pore diameter is 10 Å or more, (2) 90% or more of the whole pore volume have a pore diameter of 5 to 200 Å, (3) a specific pore volume is 0.2 cm³/g or more, and (4) it is obtained by using, as a template, a quaternary ammonium ion of the following general formula (I) or an amine of the following general formula (II), then, removing the template, $$[NR^1R^2R^3R^4]^+ \quad (I)$$

(in the formula (I), $R^1$ represents a linear or branched hydrocarbon group having 2 to 36 carbon atoms, and $R^2$ to $R^4$ represent an alkyl group having 1 to 6 carbon atoms), $$NR^5R^6R^7 \quad (II)$$

(in the formula (II), $R^5$ represents a linear or branched hydrocarbon group having 2 to 36 carbon atoms, and $R^6$ and $R^7$ represent hydrogen or an alkyl group having 1 to 6 carbon atoms).

2. The molded catalyst according to claim 1, wherein the molded catalyst is produced by a compression molding method.

3. A process for producing the molded catalyst of claim 1, comprising the following steps:

first step: a step for obtaining a solid containing a catalyst component and a template by mixing and stirring a silica source, a titanium source, and a quaternary ammonium ion or amine as a template in liquid condition, second step: a step for molding the solid containing the catalyst component, and third step: a step for removing the template from the solid containing the catalyst component and the template.

4. The process according to claim 3, wherein the molding is conducted by a compression molding method.

5. The production method according to claim 4, wherein the solid containing a catalyst component subjected to compression molding has a water content of 1 to 70 wt %.

6. A process for producing an oxirane compound, comprising reacting an olefin type compound with a hydroperoxide in the presence of the molded catalyst of claim 1.

* * * * *